United States Patent [19]

Maeda

[11] 4,002,407
[45] Jan. 11, 1977

[54] OBJECTIVE

[75] Inventor: Haruo Maeda, Fuchu, Japan

[73] Assignee: Olympus Optical Co., Ltd., Tokyo, Japan

[22] Filed: Dec. 4, 1975

[21] Appl. No.: 637,682

[30] Foreign Application Priority Data

Dec. 6, 1974   Japan ............................. 49-140718

[52] U.S. Cl. ..................... 350/229; 350/175 ML
[51] Int. Cl.² .................. G01B 21/02; G01B 9/12
[58] Field of Search ..................... 350/229, 175 ML

[56] References Cited
UNITED STATES PATENTS 2,781,694   2/1957   Takahashi ..................... 350/229

3,476,462   11/1969   Benford ........................... 350/229

*Primary Examiner*—John K. Corbin
*Assistant Examiner*—Conrad Clark
*Attorney, Agent, or Firm*—Cushman, Darby & Cushman

[57] ABSTRACT

A light-weight objective which comprises a small number of lens components, i.e., a first positive lens component, a second positive lens component and a third positive cemented lens component and can be manufactured at low cost, and wherein aberrations are favorably corrected at a wavelength of 6328 A.

1 Claim, 5 Drawing Figures

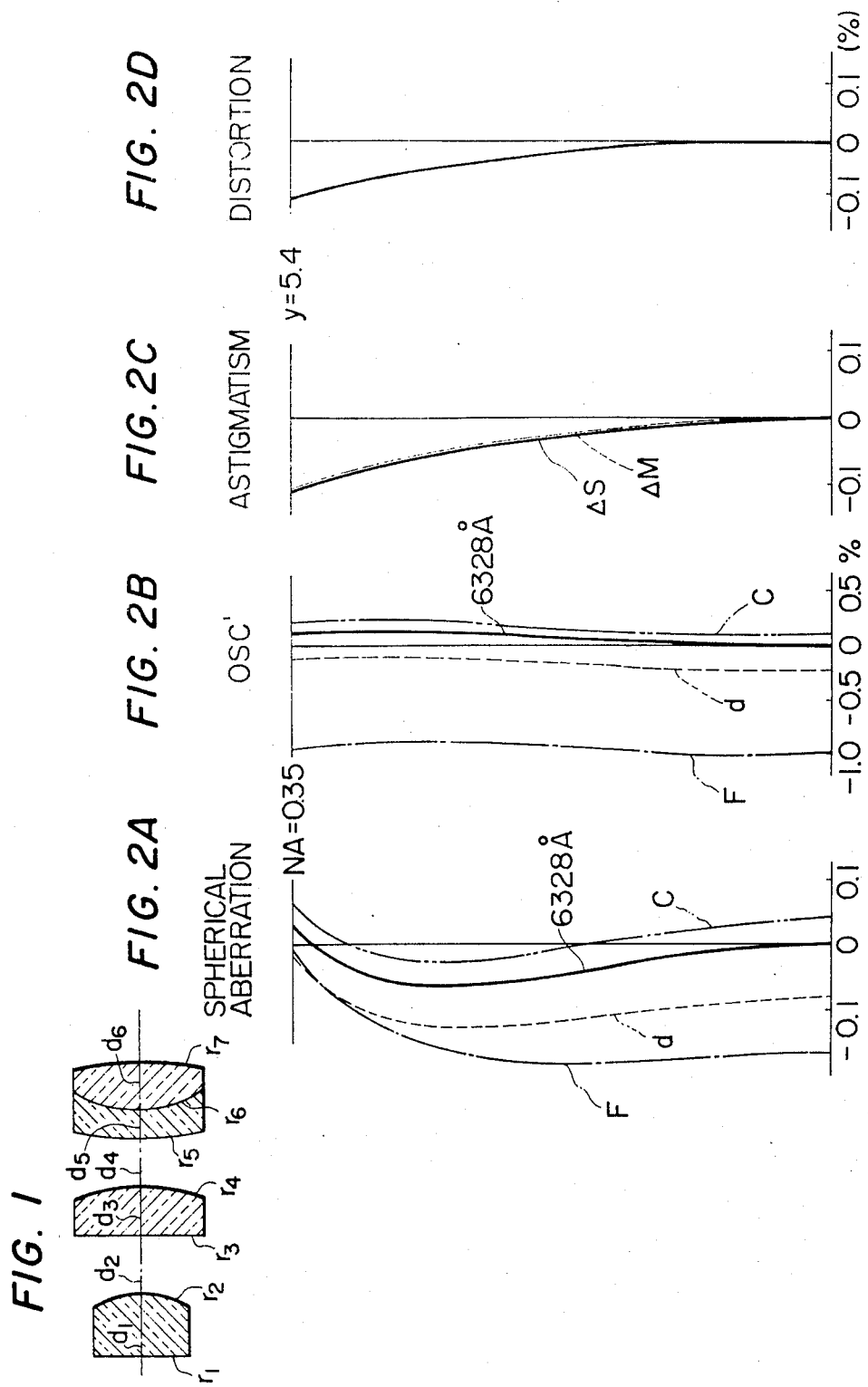

OBJECTIVE

BACKGROUND OF THE INVENTION

1. Field of the Invention

The present invention relates to an objective on the order of apochromat and, more particularly, to an objective for magnification of 10× to 15×.

2. Description of the Prior Art

General objective designed on the order of apochromat and magnification of 10× to 15× comprise five or more lens components, thereby making the objectives rather heavy and requiring high manufacturing cost. In order to reduce both weight and manufacturing cost of objectives, it will be required to reduce the number of lens components and use low-priced glass having a low refractive index as material of each lens component.

When an objective system is designed with a small number of lens components which are made of glass having a low refractive index, however, spherical aberration is aggravated since it is required to enhance power of each lens surface and especially minimize radius of curvature on each surface.

SUMMARY OF THE INVENTION

A general object of the present invention is therefore to provide a light-weight objective which can be manufactured at low cost and wherein aberration for a monochromatic ray (6328 A) is favorably corrected.

BRIEF DESCRIPTION OF THE DRAWINGS

FIG. 1 shows a sectional view illustrating the composition of the objective according to the present invention; and FIG. 2A through FIG. 2D shows graphs illustrating the abberation characteristic of the objective according to the present invention.

DESCRIPTION OF THE PREFERRED EMBODIMENTS

The objective according to the present invention comprises a first positive lens component, a second positive lens component and a third positive cemented doublet lens component, said objective system having the following numerical data:

$f = 1.0$, NA $= 0.35$, WD $= 0.164$, $\beta = 13.5x$

| | | | |
|---|---|---|---|
| $r_1 = \infty$ | | | |
| | $d_1 = 0.4861$ | $n_1 = 1.51633$ | $\nu_1 = 64.1$ |
| $r_2 = -0.5612$ | | | |
| | $d_2 = 0.4111$ | | |
| $r_3 = \infty$ | | | |
| | $d_3 = 0.3897$ | $n_2 = 1.51633$ | $\nu_2 = 64.1$ |
| $r_4 = -1.3446$ | | | |
| | $d_4 = 0.3592$ | | |
| $r_5 = 2.3324$ | | | |
| | $d_5 = 0.2109$ | $n_3 = 1.74077$ | $\nu_3 = 27.8$ |
| $r_6 = 0.8853$ | | | |
| | $d_6 = 0.3782$ | $n_4 = 1.51633$ | $\nu_4 = 64.1$ |
| $r_7 = -2.1008$ | | | | wherein the reference symbols represent as defined below:

$f$: total focal length of the objective
NA: numerical aperture of the objective
$\beta$: magnification of the objective
$r_1$ through $r_7$: radii of curvature on the surfaces of respective lens elements
$d_1$ through $d_6$: thicknesses of the respective lens elements and airspaces
$n_1$ through $n_4$: refractive indices of the respective lens elements
$\nu_1$ through $\nu_4$: Abbe's numbers of the respective lens elements The objective according to the present invention described above is so adapted as to satisfy the following condition:

$$0.9f < d_2 + d_3 + d_4 < 1.3f$$

Since the number of the lens components is reduced by so adapting the objective as to satisfy the above-mentioned condition, spherical aberration is favorably corrected and sine condition is improved in spite of high power given to each lens component in the objective according to the present invention.

Further, for making it possible to machine and polish the lens elements at low cost while favorably correcting spherical aberration, the third lens component is so designed as to satisfy the following condition:

$$0.8f < r_6 < 1.2f$$

The significance of this condition will be described in more details:

When radius of curvature $r_6$ exceeds the upper limit of $1.2f$, spherical aberration will be aggravated in the objective. When $r_6$ is smaller than the lower limit of $0.8f$, in contrast, a high cost will be required for machining the third lens component, since it becomes impossible in practice to polish a large number of lenses at a time or, in some cases, it may be required to polish only one lens at a time when radius of curvature becomes small as compared with the outside diameter of the lens.

According to the present invention, each lens element is made of glass having a low dispersion and low refractive index as specified in the numerical data for reducing manufacturing cost of the objective. Since the objective according to the present invention is intended chiefly for use at wavelength of 6328 A, it is sufficient to consider only aberration for monochromatic rays around 6328 A. In practice, however, the objective is assembled and adjusted while observing a pattern through it. However, such observation of a pattern will be inconvenient if aberration is corrected only for a specific monochromatic ray in the objective. For eliminating such inconvenience, the objective according to the present invention comprises the third cemented lens component for correcting chromatic aberration, thereby favorably correcting spherical aberration around 5786 A ($d$ line) and 5461 A ($e$ line) for assuring a high relative spectral luminosity for human eyes.

In the objective according to the present invention, the first and second lens components have plane surfaces on their object sides so that the lenses can be manufactured easily and at low cost.

As is understood from the foregoing, the objective according to the present invention is light in its weight and can be manufactured at low cost. In addition, spherical and other aberrations are favorably corrected in the objective as illustrated in FIG. 2A through FIG. 2D showing its aberration characteristic. FIG. 2C and FIG. 2D show curves illustrating astigmatism and distortion at a specific wavelength of 6328 A.

I claim:

1. An objective comprising a first positive lens component, a second positive lens component and a third positive cemented doublet lens component, and said objective having the following numerical data:

$f = 1.0$, $NA = 0.35$, $WD = 0.164$, $\beta = 13.5x$ $r_1 = \infty$
$\quad d_1 = 0.4861 \quad n_1 = 1.51633 \quad \nu_1 = 64.1$
$r_2 = -0.5612$
$\quad d_2 = 0.4111$
$r_3 = \infty$
$\quad d_3 = 0.3897 \quad n_2 = 1.51633 \quad \nu_2 = 64.1$
$r_4 = -1.3446$
$\quad d_4 = 0.3592$
$r_5 = 2.3324$
$\quad d_5 = 0.2109 \quad n_3 = 1.74077 \quad \nu_3 = 27.8$
$r_6 = 0.8853$
$\quad d_6 = 0.3782 \quad n_4 = 1.51633 \quad \nu_4 = 64.1$
$r_7 = -2.1008$ wherein the reference symbols $r_1$ through $r_7$ represent radii of curvature on the surfaces of the lens components, the reference symbols $d_1$ through $d_6$ denote thicknesses of the lens elements and air spaces, reference symbols $n_1$ through $n_4$ designate refractive indices of the lens elements and reference symbols $\nu_1$ through $\nu_4$ represent Abbe's numbers of the lens components.

* * * * *